(12) United States Patent
Zhang et al.

(10) Patent No.: US 9,934,156 B1
(45) Date of Patent: Apr. 3, 2018

(54) HOST TRAFFIC SEPARATION SCHEME FOR SUDDEN POWER LOSS SCENARIO

(71) Applicant: SK hynix Inc., Gyeonggi-do OT (KR)

(72) Inventors: Fan Zhang, Fremont, CA (US); Chun Hok Ho, Foster City, CA (US); Yan Zhang, Milpitas, CA (US)

(73) Assignee: SK Hynix Inc., Gyeonggi-do (KR)

( * ) Notice: Subject to any disclaimer, the term of this patent is extended or adjusted under 35 U.S.C. 154(b) by 316 days.

(21) Appl. No.: 14/860,153

(22) Filed: Sep. 21, 2015

Related U.S. Application Data

(60) Provisional application No. 62/056,290, filed on Sep. 26, 2014.

(51) Int. Cl.
*G06F 12/10* (2016.01)
*G06F 12/1009* (2016.01)
*G06F 12/1081* (2016.01)

(52) U.S. Cl.
CPC ...... *G06F 12/1009* (2013.01); *G06F 12/1081* (2013.01); *G06F 2212/403* (2013.01); *G06F 2212/65* (2013.01)

(58) Field of Classification Search
CPC ............ G06F 12/1009; G06F 12/1081; G06F 2212/65; G06F 2212/406
See application file for complete search history.

(56) References Cited

U.S. PATENT DOCUMENTS

| | | | |
|---|---|---|---|
| 7,417,907 B1 * | 8/2008 | Liu ........................ | G11C 7/22 365/189.04 |
| 7,962,698 B1 * | 6/2011 | Yadav ................ | G06F 13/4234 711/149 |

* cited by examiner

*Primary Examiner* — Aracelis Ruiz
(74) *Attorney, Agent, or Firm* — IP & T Group LLP

(57) ABSTRACT

A host write is received which includes a write address and write data. It is determined if the write address is already stored in at least one of a plurality of open blocks. If so, a collision open block is determined at least the write data is stored in the collision open block. In the event it is determined that the write address is not already stored in at least one of the plurality of open blocks, a temperature for the host write is determined and at least the write data is stored in an open block associated with the temperature.

20 Claims, 9 Drawing Sheets ice# HOST TRAFFIC SEPARATION SCHEME FOR SUDDEN POWER LOSS SCENARIO

CROSS REFERENCE TO OTHER APPLICATIONS

This application claims priority to U.S. Provisional Patent Application No. 62/056,290 entitled AUTOMATIC HOST TRAFFIC SEPARATION SCHEME filed Sep. 26, 2014 which is incorporated herein by reference for all purposes.

BACKGROUND OF THE INVENTION

Host write traffic includes data having a variety of temperatures. The temperature associated with a given piece of data refers to how frequently a rewrite or update will occur. Hot data is updated frequently while cold data is updated infrequently. Although techniques exist to separate host write traffic based on temperature (e.g., so that hot data is stored with hot data and cold data is stored with cold data), current host traffic separation techniques do not take into account certain error scenarios. It would be desirable to have more robust host traffic separation techniques which are better able to handle error scenarios which are not currently being addressed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
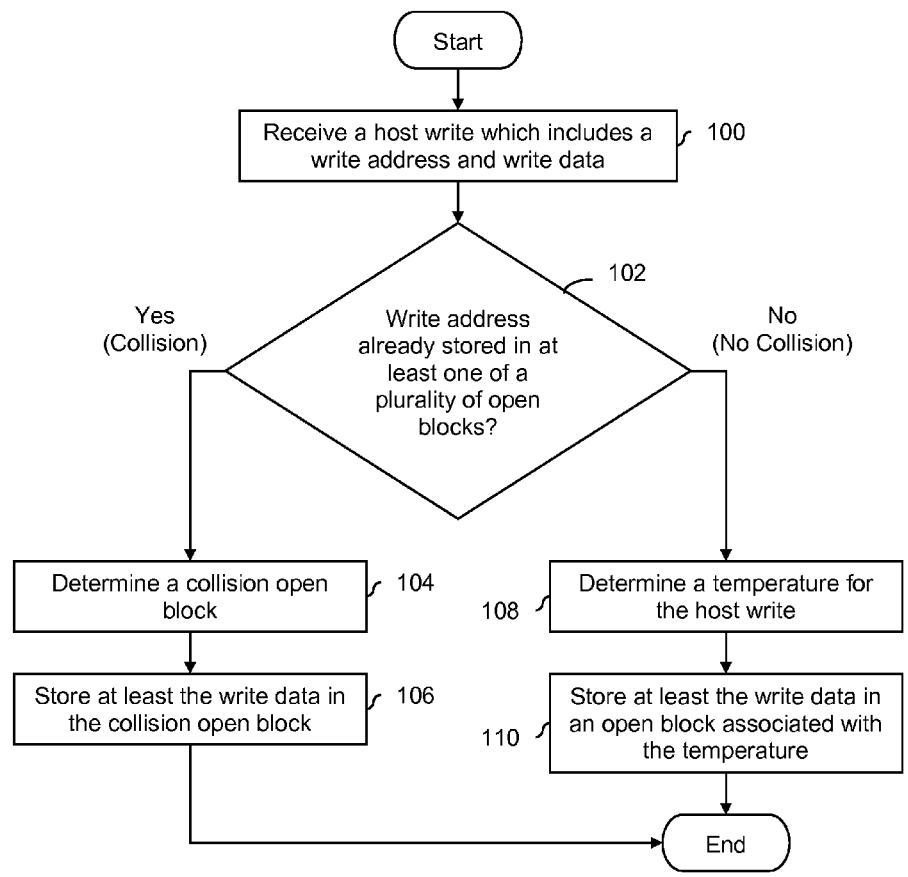
FIG. 1 is a flowchart illustrating an embodiment of a host traffic separation process.

FIG. 1 is a flowchart illustrating an embodiment of a host traffic separation process. The process shown takes into account the possibility of a sudden or unexpected loss of power, in which case a logical to physical address mapping table would need to be rebuilt (e.g., in a solid state storage controller). In some embodiments, the process is performed by a solid state storage controller, for example, which sits between a host and the solid state storage media or drive. In some embodiments, a solid state storage controller which performs the process shown is a semiconductor device, such as an application-specific integrated circuit (ASIC) or a field-programmable gate array (FPGA).

At 100, a host write is received which includes a write address and write data. For example, the host write may be received from a host by a solid state storage controller. The write address included in the host write may be a logical address, such as a logical block address. A logical to physical mapping table (e.g., which is rebuilt in the event of a sudden power loss) includes the write or logical address included in the host write, as well as the corresponding physical address which contains the most recent or up-to-date version of the write data for that write or logical address. In the event of a read instruction from the host, the solid state storage controller would use the logical to physical mapping table to know where (i.e., what physical address) to read from.

At 102, it is determined if the write address is already stored in at least one of a plurality of open blocks. A Yes decision at step 102 is sometimes referred to herein as a collision. For example, two back-to-back host writes to the same logical (block) address would most likely result in a Yes decision at step 102 (e.g., assuming that the same blocks are open during both host writes).

Blocks in a solid state storage media or drive may be classified as open, closed, or empty. An empty block is one in which no data is stored. A closed block is one which is full of write data (some of which is valid and some of which is invalid if it has been superseded by more recent data). An open block is a partially written block that still has open spaces available to be written to.

Depending upon the solid state storage system, some fixed number of blocks are open at any given time. For example, some solid state storage systems only have a single block open at a time. For those systems, rebuilding a logical to physical address mapping table is a straightforward process and the process of FIG. 1 does not apply. However, for solid state storage systems that have two or more blocks open at any given time, care must be taken to ensure that data is stored in the open blocks in a manner that ensures the logical to physical address mapping table will be able to be rebuilt properly in the event of a sudden loss of power.

In the event of a collision at step 102, a collision open block is determined at 104. A collision open block refers to an open block which is selected or otherwise written to in the event of a collision. The collision open block is selected from one of the currently open blocks. For example, if a system always has two blocks open at a time, then one of the two currently open blocks will be selected as the collision open block. Some examples of how the collision open block is determined or otherwise selected are described in more detail below.

At 106, at least the write data is stored in the collision open block. In some embodiments, the write or logical address is also stored with the write data in the collision open block, for example, in case the write or logical address stored therein is needed when rebuilding a logical to physical address mapping table in the event of a sudden or unexpected loss of power. Some exemplary table rebuild processes are described in more detail below.

In the event there is no collision at step 102, a temperature for the host write is determined at 108. At 110, at least the write data is stored in an open block associated with the temperature. For example, there may be two open blocks: one to which hot host data is written and another to which cold host data is written. Data (e.g., written to a given logical block address) that is frequently written or updated is considered hot. In one example, a backup application may overwrite older backups with newer backups and the same logical block addresses are rewritten over and over. Data that is infrequently or never updated after being initially written is called cold data. For example, digital photographs, music, and movies tend to be stored once and never updated. A more detailed example of a process for determining temperature is described below. As described above, the write address may also be stored in the open block at step 110.

The following figures describe a variety of techniques which may be used to determine a collision open block at step 104. First, an example is described in which the collision open block is the open block where the write address is (first) stored. Then, an example is described where the hottest open block is (always) selected as the collision open block.

Figure 2:
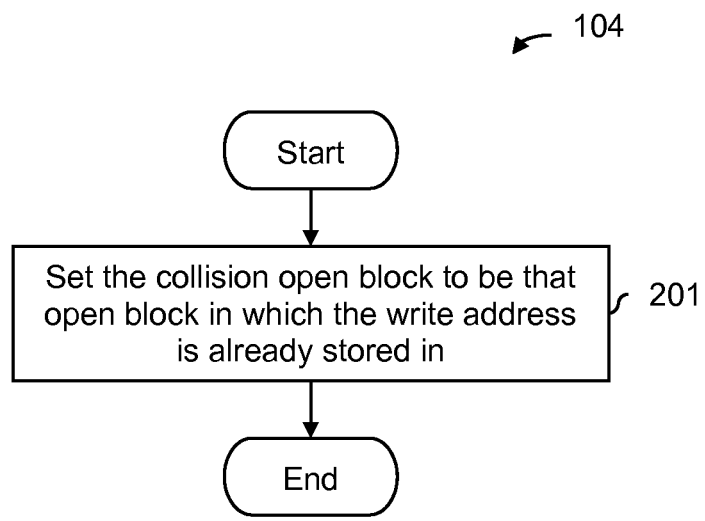
FIG. 2 is a diagram illustrating an embodiment of a process to determine a collision open block where the open block in which the write address is already stored in is selected as the collision open block.

FIG. 2 is a diagram illustrating an embodiment of a process to determine a collision open block where the open block in which the write address is already stored in is selected as the collision open block. In some embodiments, the process of FIG. 2 is used at step 104 in FIG. 1.

At 201, the collision open block is set to be that open block in which the write address is already stored in. The following figure shows an example of this.

Figure 3:
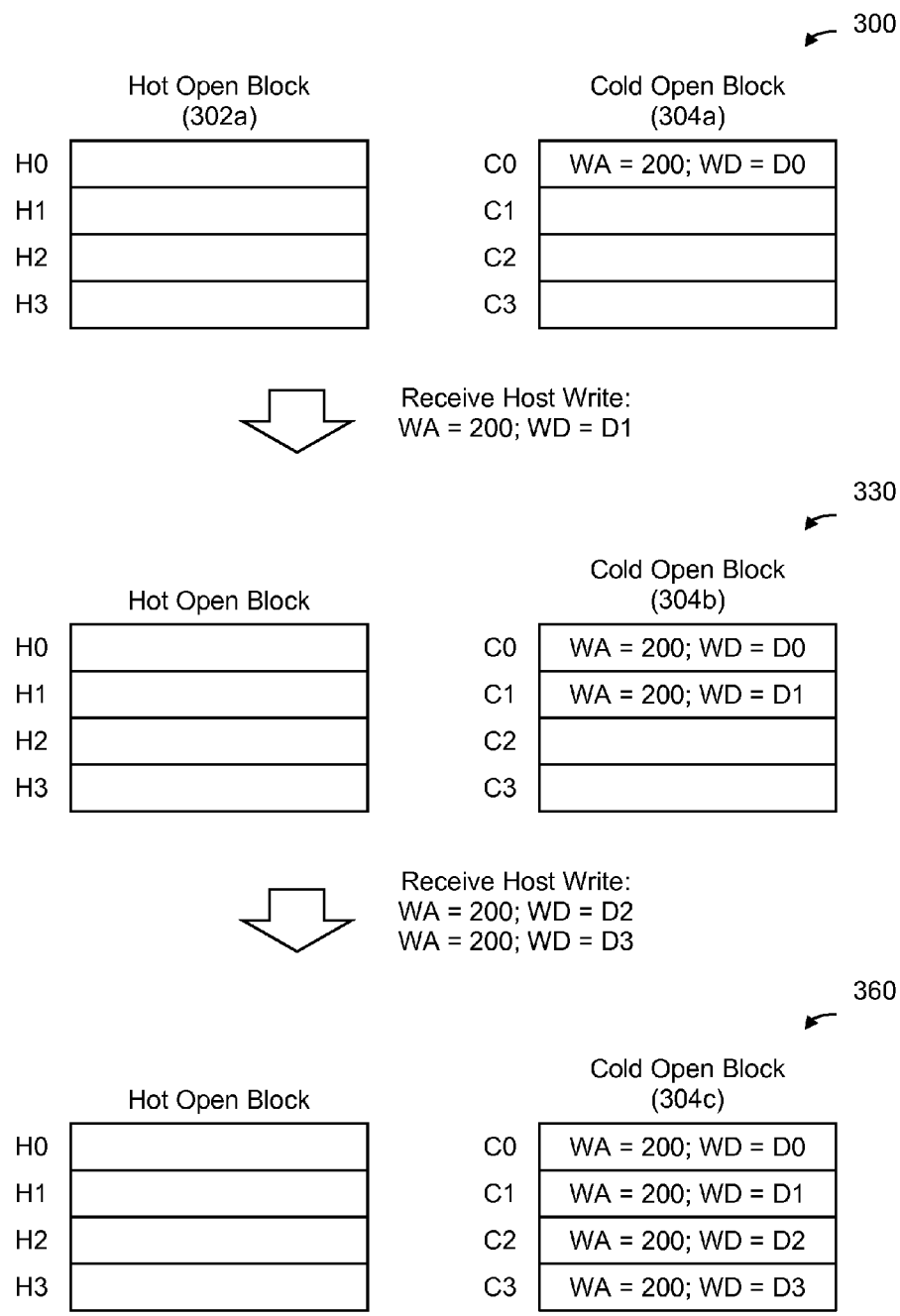
FIG. 3 is a diagram illustrating an embodiment of open blocks where the open block in which the write address is already stored in is selected as the collision open block.

FIG. 3 is a diagram illustrating an embodiment of open blocks where the open block in which the write address is already stored in is selected as the collision open block. In the example shown, a solid state storage system keeps two blocks open at a time: one for hot data and one for cold data. Naturally, a solid state storage system may keep any number of blocks open at a time (e.g., 3 blocks open, 4 blocks open, etc.).

Diagram 300 shows the two open blocks at a first point in time. In that diagram, hot open block 302a is empty and cold open block 304a contains a write address of 200 (e.g., the host write included a logical block address of 200) and write data D0. For example, a process for identifying temperature may have classified that host write as being cold data (see step 108 in FIG. 1) and the host write was therefore stored in the open block for cold data (see step 110 in FIG. 1).

A host write is then received which includes a write address of 200 and write data D1. Since the write address of 200 is already stored in cold open block 304a in diagram 300, a collision is detected. Furthermore, since cold open block 304a already has the write address of 200 stored therein, cold open block 304a would be selected as the collision open block per the process of FIG. 2.

Diagram 330 shows the two open blocks at a second point in time. Since the cold open block was selected as the collision block, the second host write is stored in the cold open block as well (see cold open block 304b).

Subsequently, two more host writes to the same logical block address are received. Per the process of FIG. 2, those host writes would also be stored in the cold open block. Note, for example, the third and fourth entries in cold open block 304c in diagram 360, which shows the hot open block and the cold open block at a third point in time.

It is noted that the collision block is selected independent of whatever temperature some temperature identification process would have assigned to the collision. For example, even if the second host write (i.e., between diagrams 300 and 330) would have been classified as hot data, the cold open block would be selected as the collision block per this technique.

It is also noted that the collision block is selected independent of whatever addresses are stored in closed blocks. For example, even though there may be some closed blocks (not shown) with a write address of 200, that fact has no bearing on the selection of the collision block. Only the write addresses contained in the currently open blocks affect the selection of the collision block.

One benefit to the technique described above is that it ensures that all of the host writes to the same logical address are kept in the same open block (at least at the time of the collision). This makes the table rebuilding process relatively straightforward since the two or more open blocks that are ingested when the table is being rebuilt will never have overlapping logical addresses. That is, whatever blocks were open when the power was suddenly lost will have unique sets of write addresses or logical addresses.

One drawback to the technique described above is that host traffic is not optimally separated according to temperature when there is a collision. For example, although the first host write (i.e., with write data D0) may have been properly classified as cold data (e.g., because that was the first time, ever, the logical block address of 200 was written), suppose that the second, third, and fourth host writes (i.e., with write data D1, D2, and D3) occurred very soon thereafter and therefore should be classified as hot data. It would be better (e.g., as measured by write amplification) in that case if the second, third, and fourth host writes were instead stored in the hot open block as opposed to the cold open block. Generally speaking, a solid state storage system performs better (e.g., demonstrated by having a lower write amplification value) when hot data is kept with hot data and cold data is kept with cold data. The following figures describe a technique which better separates host writes based on temperature, but still enables the solid state storage system to properly rebuild a logical to physical address mapping table in the event of a sudden loss of power.

Figure 4:
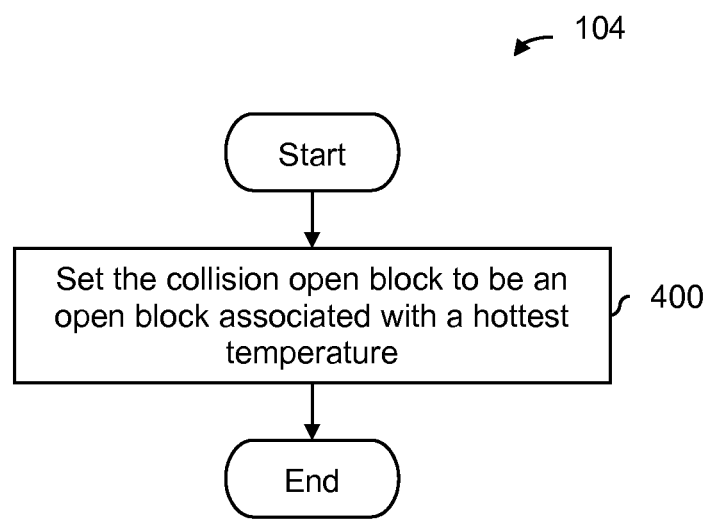
FIG. 4 is a diagram illustrating an embodiment of a process to determine a collision open block where the open block associated with a hottest temperature is selected as the collision open block.

FIG. 4 is a diagram illustrating an embodiment of a process to determine a collision open block where the open block associated with a hottest temperature is selected as the collision open block. In some embodiments, the process of FIG. 4 is used at step 104 in FIG. 1.

At 400, the collision open block is set to be an open block associated with a hottest temperature. The following figure shows an example of this.

Figure 5:
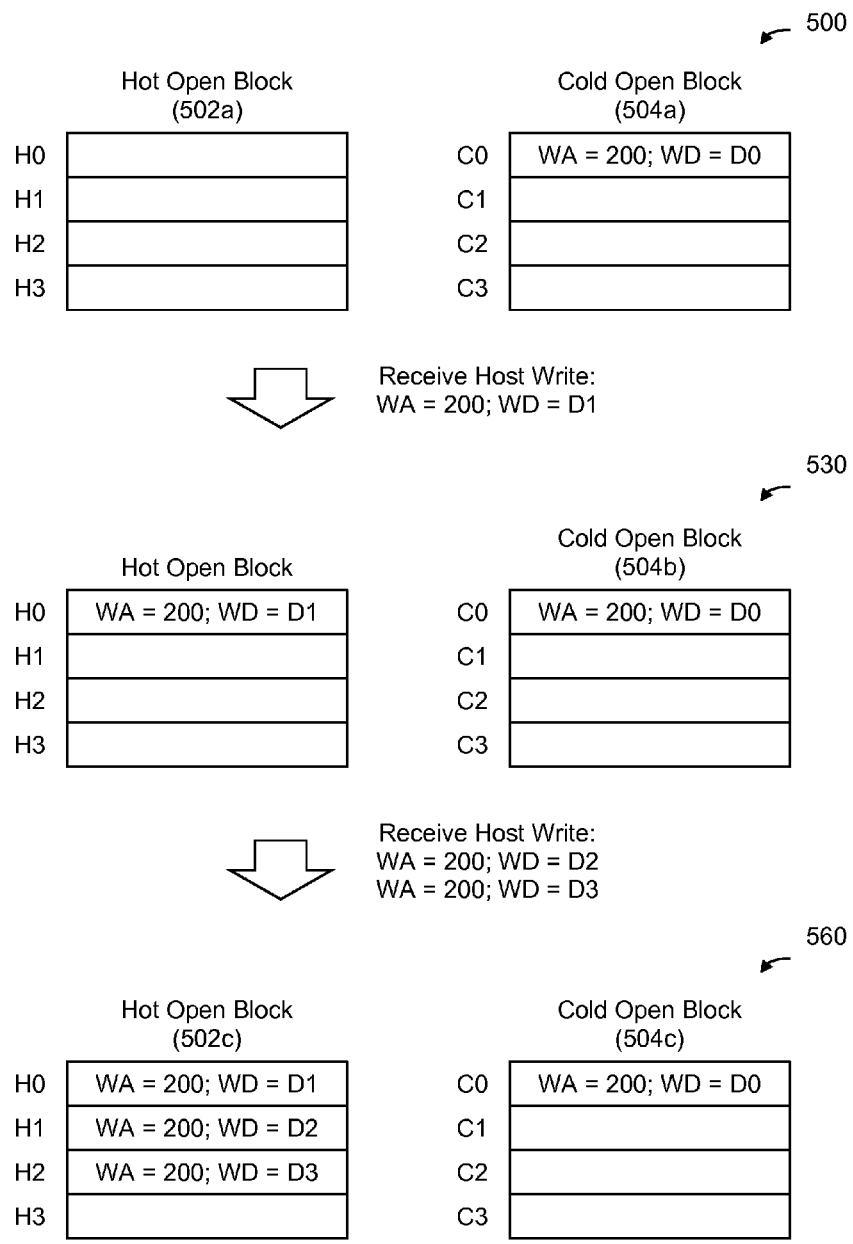
FIG. 5 is a diagram illustrating an embodiment of open blocks where the hottest open block is selected as the collision open block.

FIG. 5 is a diagram illustrating an embodiment of open blocks where the hottest open block is selected as the collision open block. Diagram 500 shows a hot open block 502a and a cold open block 504a at a first time in time. In the state shown, the open blocks are in the same state as that shown in diagram 300 in FIG. 3. That is, the hot open block is empty but the cold open block has a host write with a write address of 200 and write data of D0.

In this example, the same second host write is received (i.e., again writing to logical block address 200 with write data of D1) but this time the collision open block is selected according to FIG. 4. In this example, the open block associated with the hottest temperature is selected as the collision open block. As such, the second host write is written to hot open block 502b, as is shown in diagram 530.

The same third and fourth host writes (i.e., with write data D2 and D3) are then received. Again, per this technique, the hot open block is selected as the collision open block and the third and fourth host writes are written to hot open block 502c, as is shown in diagram 560.

Since the system knows that the collision open block is the open block associated with the hottest temperature, a rebuild process will know that the host write in the cold open block is older than the host writes in the hot open block and can rebuild the logical to physical mapping table accordingly.

The following figures describe a variety of table rebuilding processes. First, an exemplary table rebuild process which corresponds to the examples of FIGS. 2 and 3 is described. Then, an exemplary table rebuild process which corresponds to the examples of FIGS. 4 and 5 is described.

Figure 6:
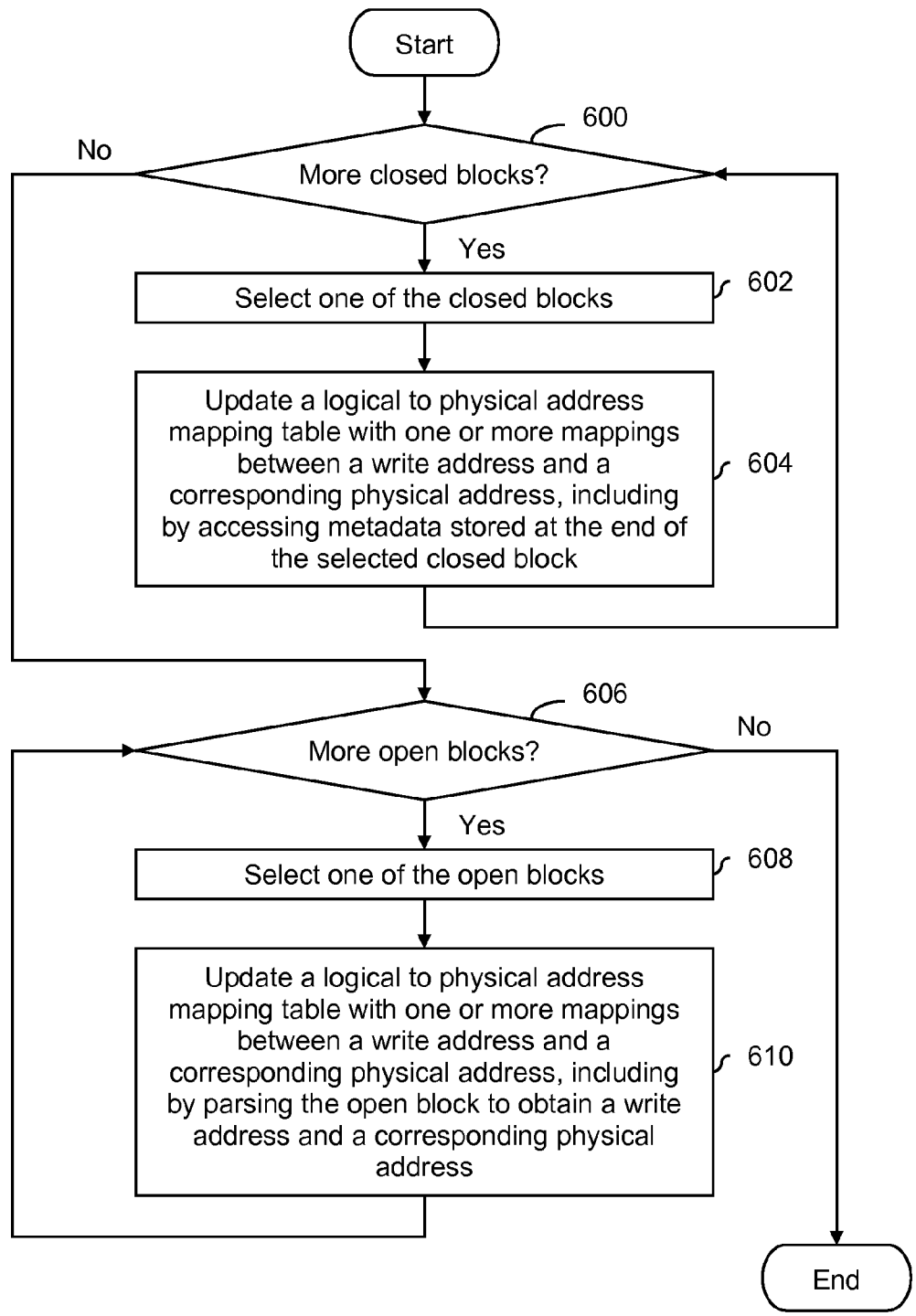
FIG. 6 is a flowchart illustrating an embodiment of a table rebuild process when the open block in which the write address is already stored in is selected as the collision open block.

FIG. 6 is a flowchart illustrating an embodiment of a table rebuild process when the open block in which the write address is already stored in is selected as the collision open block. This example corresponds to the examples of FIGS. 2 and 3.

At 600, it is determined if there are more closed blocks. In this example, when rebuilding the mapping table, the closed blocks are processed before the open blocks. Closed blocks are older than open blocks, and so processing the closed blocks first, followed by the open blocks, ensures that the correct sequencing is followed so that any updates contained in the open blocks overwrite their counterparts (if any) in the closed blocks.

At 602, in the event there are more closed blocks, one of the closed blocks is selected. In one example, the closed blocks are processed in chronological order where the oldest closed blocks (e.g., the blocks which were closed the furthest in the past) are processed before newer closed blocks (e.g., the blocks which were closed more recently). In some embodiments, the storage controller keeps a list of the blocks in the order in which they were written and goes off of this at step 602.

At 604, a logical to physical address mapping table is updated with one or more mappings between a write address and a corresponding physical address, including by accessing metadata stored at the end of the selected closed block. In this example, there is metadata at the end of the closed block that summarizes the address mapping contained within that closed block and the metadata is used to perform the update at step 604. If a given logical address is already recorded (but with an older physical address), then the newer physical address replaces the older physical address in the mapping for that logical address. If the logical address has never been recorded before in the table, then a new entry is created. After updating the table at step 604, the process again checks to see if there are more closed blocks at step 600.

If there are no more closed blocks at step 600, it is determined if there are more open blocks at 606. For example, there will typically be two or more open blocks. If there are more open blocks at step 606, one of the open blocks is selected at step 608. In this technique, the selection of the collision block ensures that if there are multiple instances of the same write address in an open block, all of the occurrences will be confined to the same open block. As such, any technique may be used to select the open block. In one example, open blocks are selected in order of completeness (e.g., the most complete or full open block is selected first). Since the same write will be confined to the same block, the open block selection is totally up to designer. The designer have the freedom to choose which one (s)he would like, which may be desirable.

At 610, a logical to physical address mapping table is updated with one or more mappings between a write address and a corresponding physical address, including by parsing the open block to obtain a write address and a corresponding physical address. Since these blocks were not closed before power was unexpectedly lost, there is no metadata at the end of the block that summarizes or otherwise neatly encapsulates the address mapping information contained within that open block. Thus, the rebuild process parses the information stored in the open block, looking for write addresses stored in the open block and noting the physical location within the block at which the host data is stored. This mapping information is then used to update the mapping table.

After updating the mapping table at 610, it is determined if there are more open blocks at 606. If not, the process ends.

Figure 7:
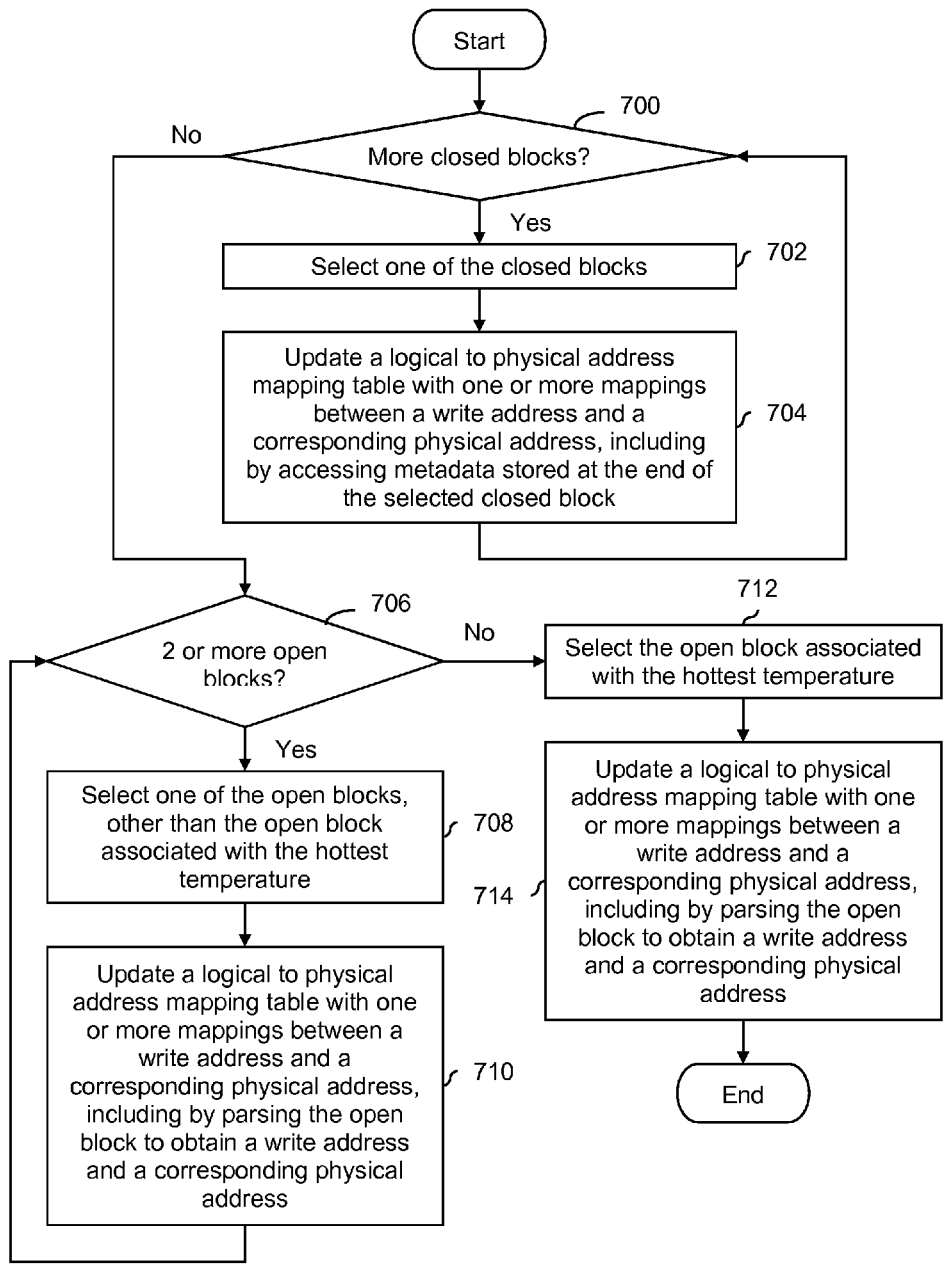
FIG. 7 is a flowchart illustrating an embodiment of a table rebuild process where the open block associated with a hottest temperature is selected as the collision open block.

FIG. 7 is a flowchart illustrating an embodiment of a table rebuild process where the open block associated with a hottest temperature is selected as the collision open block. This example corresponds to the examples of FIGS. 4 and 5.

At 700, it is determined if there are more closed blocks. As in the previous example, closed blocks are processed before open blocks.

If there are more closed blocks at 700, then one of the closed blocks is selected at 702. For example, the order in which the blocks were closed may be used. At 704, a logical to physical address mapping table is updated with one or more mappings between a write address and a corresponding physical address, including by accessing metadata stored at the end of the selected closed block. As described above, closed blocks have metadata at their end that summarizes or otherwise encapsulates the address mapping information associated with that closed block.

After updating the mapping table at 704, it is determined again at 700 if there are more closed blocks. If not, it is determined at 706 if there are two or more open blocks. If so, one of the open blocks is selected at 708, other than the open block associated with the hottest temperature. For example, the most full or complete open block (e.g., other than the hottest open block) is selected at 708. In diagram 560 in FIG. 5, cold open block 504c would be selected.

At 710, a logical to physical address mapping table is updated with one or more mappings between a write address and a corresponding physical address, including by parsing the open block to obtain a write address and a corresponding physical address. Since the block is an open block, there is no convenient block of metadata that concisely summarizes the logical to physical address mappings contained in that open block.

After updating the mapping table at 710, it is determined again at 706 if there are two or more open blocks. If not (e.g., because there is only one open block left), the open block associated with the hottest temperature is selected at 712. For example, in diagram 560 in FIG. 5, hot open block 502c would be selected.

At 714, a logical to physical address mapping table is updated with one or more mappings between a write address and a corresponding physical address, including by parsing the open block to obtain a write address and a corresponding physical address. Step 714 is the same as step 710 (e.g., they are just shown separately so that the process after step 714 can end as opposed to returning to step 706 after step 710). To continue the example from above, processing hot open block 502c after cold open block 504c while rebuilding the mapping table ensures that any logical block addresses that are common to both hot open block 502c and cold open block 504c will end up with mapping information from the hot open block (which is the more recent mapping information), resulting in a properly reconstructed mapping table.

The following figure shows an example process for determining a temperature for a host write. In some embodiments, the process is used at step 108 in FIG. 1.

Figure 8:
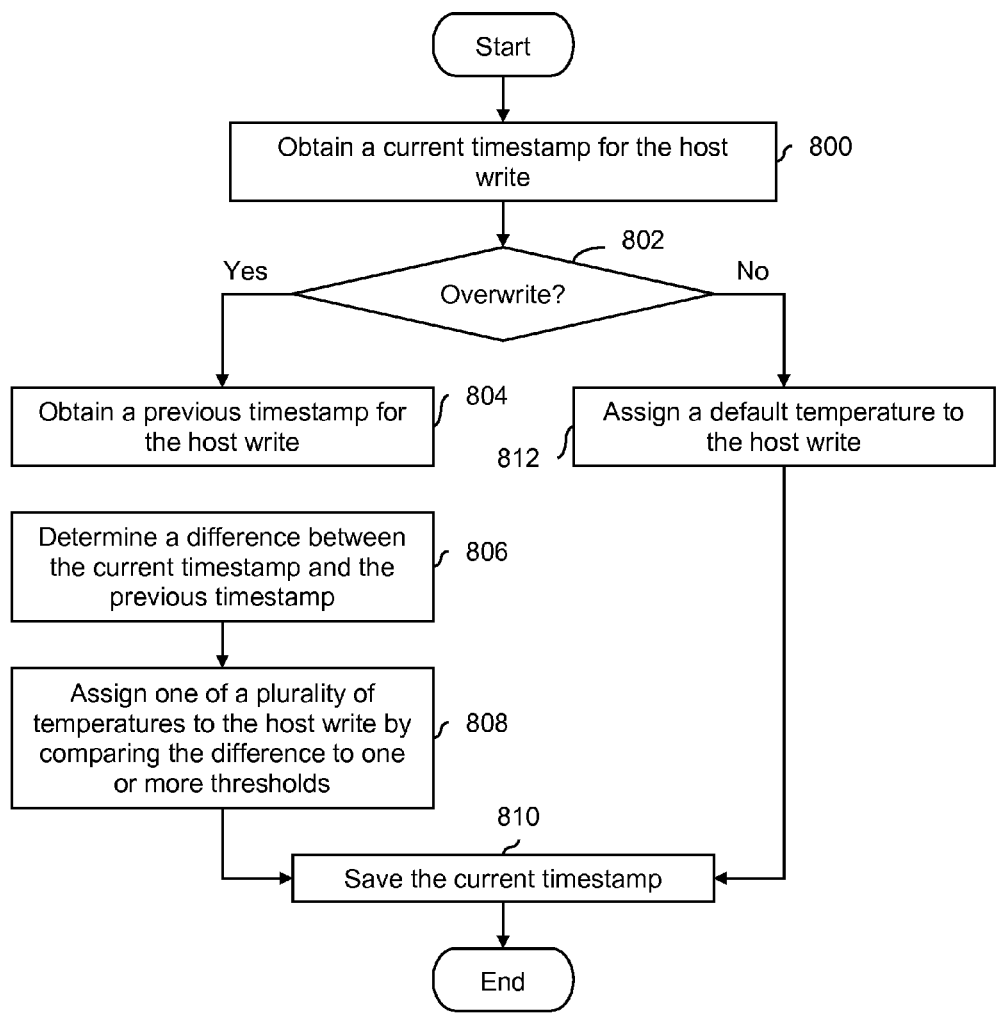
FIG. 8 is a flowchart illustrating an embodiment of a process to determine a temperature using timestamps.

FIG. 8 is a flowchart illustrating an embodiment of a process to determine a temperature using timestamps.

At 800, a current timestamp is obtained for the host write. In one example, there is a free-running clock from which the current timestamp is obtained. The clock may be a 64-bit block where one cycle corresponds to the shortest amount of time possible between two consecutive host writes. This ensures that even back-to-back host writes will have different timestamps. To mitigate the possibility of the timestamp flipping over to 0, in some embodiments, the free-running clock does not start running until the first host write occurs and/or the free-running clock is reset whenever the solid state storage media is (completely) erased or the system is otherwise reset.

At 802, it is determined if an overwrite has occurred. An overwrite is different from the collision described in FIG. 1. A collision occurs when a logical block address (as an example) is received as part of a host write and that logical block address is already stored in one of the (current) open blocks. An overwrite occurs if the logical block address has been written before, for example, and is contained in a closed block. For example, the host write may have occurred so long ago that the logical block address is in a closed block. In that case, an overwrite has occurred, but a collision has not occurred.

If there is no overwrite at 802 (e.g., because it is the first time a given host address is being written to), then a default temperature is assigned to the host write at 812. In some embodiments, a hot or warm temperature is the default temperature; in such embodiments, a cold temperature is never the default temperature. For example, suppose there are five different temperature groups where group 5 is the hottest and group 1 is the coldest, the default temperature could be set to group 3. In some other embodiments (e.g., where there is an adaptive temperature detection scheme), when a sequence of hot traffic is detected, the default temperature is changed to group 5 for that traffic.

After assigning the default temperature at 812, the current timestamp is saved at 810. As will be described in more detail below, this enables the system to know how much time has elapsed since the last host write to that (as an example) logical block address.

If there is an overwrite at 802 (e.g., because the host address has been written to before), then a previous timestamp for the host write is obtained at 804. For example, the timestamp saved at 810 is obtained from storage. At 806, a difference between the current timestamp and the previous timestamp is determined. One of a plurality of temperatures is then assigned to the host write by comparing the difference to one or more thresholds at 808. For example, a single threshold would be used if there are only two temperatures being assigned (e.g., hot and cold). If the difference is lower than the threshold, then a hot temperature is assigned. If the difference is greater than the threshold, then a cold temperature is assigned. If three temperatures are being assigned (e.g., hot, warm, or cold), then two thresholds would be used at step 808.

The current timestamp is then saved at 810. For example, the new timestamp (e.g., obtained at 800) would replace the previous timestamp (e.g., at 804) in storage.

The following figure is an example of a system which performs the processes described above.

Figure 9:
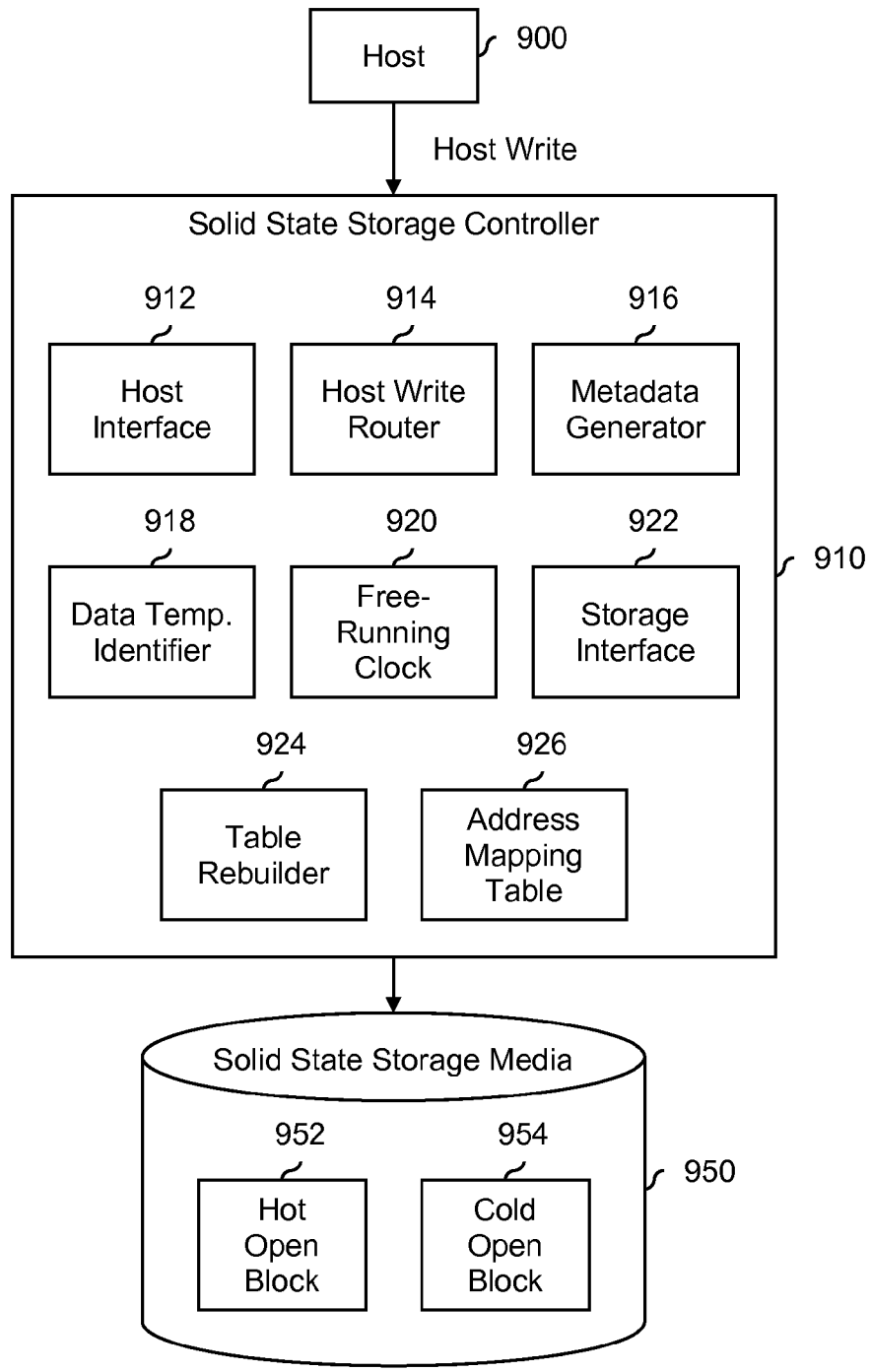
FIG. 9 is a diagram illustrating an embodiment of a solid state storage system.

FIG. 9 is a diagram illustrating an embodiment of a solid state storage system. In the example shown, solid state storage controller 910 writes host writes to open blocks 952 and 954 in a manner that permits the proper rebuilding of a logical to physical address mapping table in the event power is unexpectedly lost and the mapping table needs to be rebuilt. In some embodiments, solid state storage controller 910 performs the process of FIG. 1. In some embodiments, solid state storage controller 910 is a semiconductor device, such as an application-specific integrated circuit (ASIC) or a field-programmable gate array (FPGA).

Host writes are passed from host 900 to solid state storage controller 910. Solid state storage controller 910 includes host interface 912, which may be responsible for communicating with host 900. In some embodiments, host interface 912 receives host writes at step 100 in FIG. 1.

Host write router 914 is responsible for selecting either hot open block 952 or cold open block 954 as the open block to which a received host write is written to. Metadata generator 916 assembles metadata which is written at the end of a closed block (e.g., when an open block is closed) and summarizes the logical to physical address mappings associated with a particular block. As part of generating the metadata, metadata generator 916 needs to know what (logical) write addresses are in each of the currently open blocks (in this case, hot open block 952 and cold open block 954). As such, the information in metadata generator 916 may be used by host write router 914 to determine whether there is a collision at step 102 in FIG. 1.

If there is a collision, then host write router 914 may be responsible for determining a collision open block at step 104. For example, host write router 914 may use the process of FIG. 2 or FIG. 4 or even some other technique.

If there is no collision, then data temperature identifier 918 may be responsible for determining the temperature at step 108 in FIG. 1. For example, free-running clock 920 may be used if the technique of FIG. 8 is used. To write the write data (and possibly the write address) to the selected open block, storage interface 922 may be used.

In the example shown, solid state storage media 950 includes hot open block 952 and cold open block 954. For brevity, empty blocks and closed blocks are not shown in solid state storage media 950.

In the event of an unexpected loss of power, the closed blocks (not shown) and open blocks 952 and 954 are processed by table rebuilder 924 in order to rebuild logical to physical address mapping table 926 in controller 910 which may be at least partially stored in volatile memory. In various embodiments, table rebuilder 924 performs the process of FIG. 6 or FIG. 7. Naturally, there may be any number of open blocks besides the two shown in this example.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a host interface configured to receive a host write which includes a write address and write data;
   a host write router configured to:
      determine if the write address is already stored in at least one of a plurality of open blocks; and
      in the event it is determined that the write address is already stored in at least one of the plurality of open blocks, determine a collision open block;
   a data temperature identifier configured to, in the event it is determined that the write address is not already stored in at least one of the plurality of open blocks, determine a temperature for the host write; and
   a storage interface configured to:
      in the event it is determined that the write address is already stored in at least one of the plurality of open blocks, store at least the write data in the collision open block; and
      in the event it is determined that the write address is not already stored in at least one of the plurality of open blocks, store at least the write data in an open block associated with the temperature.

2. The system recited in claim 1, wherein the system includes a semiconductor device, including one or more of the following: an application-specific integrated circuit (ASIC) or a field-programmable gate array (FPGA).

3. The system recited in claim 1, wherein determining the collision open block includes setting the collision open block to be that open block in which the write address is already stored in.

4. The system recited in claim 1, wherein determining the collision open block includes setting the collision open block to be an open block associated with a hottest temperature.

5. The system recited in claim 1 further comprising a table rebuilder configured to:
   determine if there are more closed blocks;
   in the event it is determined that there are more closed blocks:
      select one of the closed blocks; and
      update a logical to physical address mapping table with one or more mappings between a write address and a corresponding physical address, including by accessing metadata stored at the end of the selected closed block; and
   in the event it is determined that there are no more closed blocks:
      determine if there are more open blocks; and
      in the event it is determined that there are more open blocks:
         select one of the open blocks; and
         update the logical to physical address mapping table with one or more mappings between a write address and a corresponding physical address, including by parsing the open block to obtain a write address and a corresponding physical address.

6. The system recited in claim 1 further comprising a table rebuilder configured to:
   determine if there are more closed blocks;
   in the event it is determined that there are more closed blocks:
      select one of the closed blocks; and
      update a logical to physical address mapping table with one or more mappings between a write address and a corresponding physical address, including by accessing metadata stored at the end of the selected closed block; and
   in the event it is determined that there are no more closed blocks:
      determine if there are two or more open blocks;
      in the event it is determined that there are two or more open blocks:
         select one of the open blocks, other than an open block associated with a hottest temperature; and
         update the logical to physical address mapping table with one or more mappings between a write address and a corresponding physical address, including by parsing the open block to obtain a write address and a corresponding physical address; and
      in the event it is determined that there are one or fewer open blocks:
         select the open block associated with the hottest temperature; and
         update the logical to physical address mapping table with one or more mappings between a write address and a corresponding physical address, including by parsing the open block to obtain a write address and a corresponding physical address.

7. The system recited in claim 1, wherein determining the temperature for the host write includes:
   obtaining a current timestamp for the host write;
   determining if there is an overwrite;
   in the event it is determined that there is an overwrite:
      obtaining a previous timestamp for the host write;
      determining a difference between the current timestamp and the previous timestamp; and
      assigning one of a plurality of temperatures to the host write by comparing the difference to one or more thresholds;
   in the event it is determined that there is no overwrite, assigning a default temperature to the host write; and
   saving the current timestamp.

8. A method, comprising:
   receiving a host write which includes a write address and write data;
   determining if the write address is already stored in at least one of a plurality of open blocks;
   in the event it is determined that the write address is already stored in at least one of the plurality of open blocks:
      determining a collision open block; and storing at least the write data in the collision open block; and
in the event it is determined that the write address is not already stored in at least one of the plurality of open blocks:
determining a temperature for the host write; and
storing at least the write data in an open block associated with the temperature.

9. The method recited in claim 8, wherein the method is performed by a semiconductor device, including one or more of the following: an application-specific integrated circuit (ASIC) or a field-programmable gate array (FPGA).

10. The method recited in claim 8, wherein determining the collision open block includes setting the collision open block to be that open block in which the write address is already stored in.

11. The method recited in claim 8, wherein determining the collision open block includes setting the collision open block to be an open block associated with a hottest temperature.

12. The method recited in claim 8 further comprising:
determining if there are more closed blocks;
in the event it is determined that there are more closed blocks:
selecting one of the closed blocks; and
updating a logical to physical address mapping table with one or more mappings between a write address and a corresponding physical address, including by accessing metadata stored at the end of the selected closed block; and
in the event it is determined that there are no more closed blocks:
determining if there are more open blocks; and
in the event it is determined that there are more open blocks:
selecting one of the open blocks; and
updating the logical to physical address mapping table with one or more mappings between a write address and a corresponding physical address, including by parsing the open block to obtain a write address and a corresponding physical address.

13. The method recited in claim 8 further comprising:
determining if there are more closed blocks;
in the event it is determined that there are more closed blocks:
selecting one of the closed blocks; and
updating a logical to physical address mapping table with one or more mappings between a write address and a corresponding physical address, including by accessing metadata stored at the end of the selected closed block; and
in the event it is determined that there are no more closed blocks:
determining if there are two or more open blocks;
in the event it is determined that there are two or more open blocks:
selecting one of the open blocks, other than an open block associated with a hottest temperature; and
updating the logical to physical address mapping table with one or more mappings between a write address and a corresponding physical address, including by parsing the open block to obtain a write address and a corresponding physical address; and
in the event it is determined that there are one or fewer open blocks:
selecting the open block associated with the hottest temperature; and
updating the logical to physical address mapping table with one or more mappings between a write address and a corresponding physical address, including by parsing the open block to obtain a write address and a corresponding physical address.

14. The method recited in claim 8, wherein determining the temperature for the host write includes:
obtaining a current timestamp for the host write;
determining if there is an overwrite;
in the event it is determined that there is an overwrite:
obtaining a previous timestamp for the host write;
determining a difference between the current timestamp and the previous timestamp; and
assigning one of a plurality of temperatures to the host write by comparing the difference to one or more thresholds;
in the event it is determined that there is no overwrite, assigning a default temperature to the host write; and
saving the current timestamp.

15. A computer program product, the computer program product being embodied in a non-transitory computer readable storage medium and comprising computer instructions for:
receiving a host write which includes a write address and write data;
determining if the write address is already stored in at least one of a plurality of open blocks;
in the event it is determined that the write address is already stored in at least one of the plurality of open blocks:
determining a collision open block; and
storing at least the write data in the collision open block; and
in the event it is determined that the write address is not already stored in at least one of the plurality of open blocks:
determining a temperature for the host write; and
storing at least the write data in an open block associated with the temperature.

16. The computer program product recited in claim 15, wherein the computer instructions for determining the collision open block include computer instructions for setting the collision open block to be that open block in which the write address is already stored in.

17. The computer program product recited in claim 15, wherein the computer instructions for determining the collision open block include computer instructions for setting the collision open block to be an open block associated with a hottest temperature.

18. The computer program product recited in claim 15 further comprising computer instructions for:
determining if there are more closed blocks;
in the event it is determined that there are more closed blocks:
selecting one of the closed blocks; and
updating a logical to physical address mapping table with one or more mappings between a write address and a corresponding physical address, including by accessing metadata stored at the end of the selected closed block; and
in the event it is determined that there are no more closed blocks:
determining if there are more open blocks; and in the event it is determined that there are more open blocks:
  selecting one of the open blocks; and
  updating the logical to physical address mapping table with one or more mappings between a write address and a corresponding physical address, including by parsing the open block to obtain a write address and a corresponding physical address.

19. The computer program product recited in claim 15 further comprising computer instructions for:
  determining if there are more closed blocks;
  in the event it is determined that there are more closed blocks:
    selecting one of the closed blocks; and
    updating a logical to physical address mapping table with one or more mappings between a write address and a corresponding physical address, including by accessing metadata stored at the end of the selected closed block; and
  in the event it is determined that there are no more closed blocks:
    determining if there are two or more open blocks;
    in the event it is determined that there are two or more open blocks:
      selecting one of the open blocks, other than an open block associated with a hottest temperature; and
      updating the logical to physical address mapping table with one or more mappings between a write address and a corresponding physical address, including by parsing the open block to obtain a write address and a corresponding physical address; and
    in the event it is determined that there are one or fewer open blocks:
      selecting the open block associated with the hottest temperature; and
      updating the logical to physical address mapping table with one or more mappings between a write address and a corresponding physical address, including by parsing the open block to obtain a write address and a corresponding physical address.

20. The computer program product recited in claim 15, wherein the computer instructions for determining the temperature for the host write include computer instructions for:
  obtaining a current timestamp for the host write;
  determining if there is an overwrite;
  in the event it is determined that there is an overwrite:
    obtaining a previous timestamp for the host write;
    determining a difference between the current timestamp and the previous timestamp; and
    assigning one of a plurality of temperatures to the host write by comparing the difference to one or more thresholds;
  in the event it is determined that there is no overwrite, assigning a default temperature to the host write; and
  saving the current timestamp.

* * * * *